US008234186B2

(12) United States Patent
Alba et al.

(10) Patent No.: US 8,234,186 B2
(45) Date of Patent: Jul. 31, 2012

(54) INVENTORY LOCATION MANAGEMENT

(75) Inventors: Brian S. Alba, Huntersville, NC (US);
Joseph M Walter, Charlotte, NC (US);
Miroslav S. Karamanov, Charlotte, NC (US); Margaret A. Johnson, Huntersville, NC (US); Robert Bruce Sadler, Lake Wylie, SC (US); Kristy Crist, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 338 days.

(21) Appl. No.: 11/946,567

(22) Filed: Nov. 28, 2007

(65) Prior Publication Data

US 2009/0138383 A1    May 28, 2009

(51) Int. Cl.
*G06Q 10/00* (2012.01)
(52) U.S. Cl. ............ 705/28; 705/1; 705/10; 705/16
(58) Field of Classification Search ............ 705/28, 705/39
See application file for complete search history.

(56) References Cited

U.S. PATENT DOCUMENTS

| | | | | |
|---|---|---|---|---|
| 5,799,288 | A * | 8/1998 | Tanaka et al. | 705/43 |
| 5,963,919 | A * | 10/1999 | Brinkley et al. | 705/28 |
| 6,253,187 | B1 * | 6/2001 | Fox | 705/7.35 |
| 6,260,047 | B1 * | 7/2001 | Fox et al. | 700/106 |
| 6,567,824 | B2 * | 5/2003 | Fox | 1/1 |
| 7,110,971 | B2 * | 9/2006 | Wallman | 705/36 R |
| 7,340,415 | B1 * | 3/2008 | Gasper et al. | 705/43 |
| 7,480,634 | B1 * | 1/2009 | Cornelius | 705/39 |
| 2002/0138336 | A1 * | 9/2002 | Bakes et al. | 705/10 |
| 2002/0147666 | A1 * | 10/2002 | Baseman et al. | 705/28 |
| 2002/0188537 | A1 * | 12/2002 | Leeds et al. | 705/35 |
| 2003/0126103 | A1 * | 7/2003 | Chen et al. | 706/50 |
| 2003/0212614 | A1 * | 11/2003 | Chu et al. | 705/28 |
| 2004/0182675 | A1 * | 9/2004 | Long et al. | 194/206 |
| 2007/0156543 | A1 * | 7/2007 | Klim et al. | 705/28 |
| 2007/0220047 | A1 * | 9/2007 | Barletta et al. | 707/104.1 |

OTHER PUBLICATIONS

International Search Report and Written Opinion from corresponding PCT Application No. PCT/US2008/84965 mailed on Jun. 10, 2009.

* cited by examiner

*Primary Examiner* — Matthew Gart
*Assistant Examiner* — Talia Crawley
(74) *Attorney, Agent, or Firm* — Banner & Witcoff, Ltd.; Michael A. Springs

(57) ABSTRACT

An inventory management method and system may be capable of monitoring an inventory by compiling historical data relating to the inventory, defining net inventory needs, and calculating the quantity and/or types of inventory that may be needed to maintain a suitable level of inventory. More than one inventory and respective source may be included in the calculation of the inventory needs. The calculation may determine the inventory needs at a particular location or the inventory that must be maintained at a particular location based at least in part on the historical data, the inventory needs, and the customer's needs. The inventory and/or inventory locations may be consolidated, increased, decreased, and eliminated, as suitable to meet the needs of the customer. The net change in inventory related costs resulting from facility changes such as consolidation, increase, decrease, and elimination may be calculated and optimized.

21 Claims, 7 Drawing Sheets

INVENTORY LOCATION MANAGEMENT

FIELD OF THE INVENTION

Aspects of the disclosure relate to managing inventory warehouse locations by controlling and monitoring inventory levels and lowering the risk of maintaining inadequate inventory and the cost of storing excess inventory. More specifically, aspects of the disclosure describe systems and methods for analyzing a customer's inventory needs and identifying quantities of inventory and warehouse locations that would provide the customer with the necessary inventory in a cost-effective manner.

BACKGROUND

Inventory management is a critical feature of effective and fiscally responsible management of a business' goods and services. Unused inventory does not earn money or is not invested. On many occasions, inventory is costly to maintain and may be more expensive to maintain that the inventory's market value. Inventory may create expense for storage, personnel, security, rental or lease costs, maintenance, and the like. Physical inventory cannot be invested in the form of loans, stocks, bonds, or other interest bearing instruments. The cost of cash inventory is the lost opportunity investment revenue.

Some industries, such as financial institutions, are required by government laws and regulations to maintain a minimum quantity and type of inventory that may be easily accessible. For example, some financial institutions maintain a minimum quantity and type of cash to service the businesses' end consumer or purchaser during financial transactions that occur over the course of a period of time, such as one business day. Carefully calculating the quantity and type of cash to maintain for each business permits the financial institution to service its business (e.g., clients or customers) and invest the most capital possible. A unique balance may be struck between providing the customer with the necessary quantity and denominations of cash and using the financial institution's capital to invest in other areas (i.e., to permit the cash to be invested in loans, stocks, bonds, or other interest earning instruments). The cost of cash inventory is the lost opportunity for investment revenue.

In the financial industry, customers need cash and various denominations of cash. Many manufacturers, retailers, or any corporation that provides product or goods to a purchaser needs to obtain cash for transacting purchases, returns, and the like. The financial institutions may maintain a minimum amount of cash and cash of suitable denominations for their customers to meet their physical cash needs such as payday, bonus time, financial transactions with purchasers, and the like. Oftentimes, financial institutions send their customers cash on a daily basis in accordance with the customer's needs. The needs of the customer may change on a daily, weekly, monthly, seasonally, quarterly, or yearly basis and the quantity and denominations of cash need to service the customer may change frequently.

Many financial institutions will maintain more than the minimum amount of cash needed to service a customer in order to prevent depleting their cash or to prevent failing to meet the customer's needs in response to a higher cash request. As with all inventory management, the quantity and denomination of cash must be controlled and maintained to provide the proper quantity and denominations of cash to the customers when needed, but to additionally provide the business with sufficient capital that can be invested, loaned, or otherwise used as an asset that may earn the customer money.

Cash that is left in a cash vault is expensive to maintain and may have high operations costs such as providing security to protect the cash and maintaining the personnel and building operations. Ideally, a customer would keep a minimum amount of cash in a cash vault to provide its purchasers with the cash needed to run their businesses. However, many financial institutions may overestimate the amount of cash required by their customers because they cannot calculate the amount of cash that is required to service the customer. The financial institution loses investment opportunities when the cash is not utilized by a customer and is stored in a cash vault.

An analysis tool is needed that is capable of calculating the proper balance between incoming and outgoing volumes of cash for a customer of a financial institution. Further, an analysis tool may consider the variations in cash or inventory needs of a customer over a period of time and may include analysis relating to the historical features of the customer's inventory needs. Financial institutions struggle to calculate the minimum amount of cash needed to service their customers without decreasing their earning power for investing the cash in other interest earning instruments.

BRIEF SUMMARY OF THE INVENTION

Aspects of the present disclosure address one or more of the issues mentioned above by describing a system and method for managing inventory warehouse locations. The following presents a simplified summary of the disclosure in order to provide a basic understanding of some aspects of the systems and methods for monitoring computer-executable instructions. It is not intended to identify key or critical elements of the invention nor is it intended to delineate the scope of the invention. The following summary merely presents some concepts of the disclosure in a simplified form as a prelude to the more detailed description provided below.

Aspects of the present disclosure describe a method of managing inventory. The method includes identifying a first inventory of a customer, the first inventory having at least one asset and the asset having a stock keeping unit. Historical data relating to the first inventory and a customer need is compiled, and a data file is created and stored in a memory on a computer network, the data file containing at least the historical data relating to the first inventory and the customer need. A first quantity of the first inventory commensurate with a first inventory need of the customer is calculated, and a cost of the first inventory is reduced based at least in part on the first inventory need.

In accordance with another aspect, a method of managing cash is described. The method includes calculating a first inventory having a first quantity of cash for a first location and a second inventory having a second quantity of cash for a second location. An optimum inventory is identified having an optimum quantity of the cash, the optimum quantity being less than the first quantity and less than the second quantity. An optimum quantity of the cash for maintaining the optimum inventory is calculated, and a value of the cash stored at the first location and the second location is maximized by permitting the first location and the second location to access the optimum quantity of the cash.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
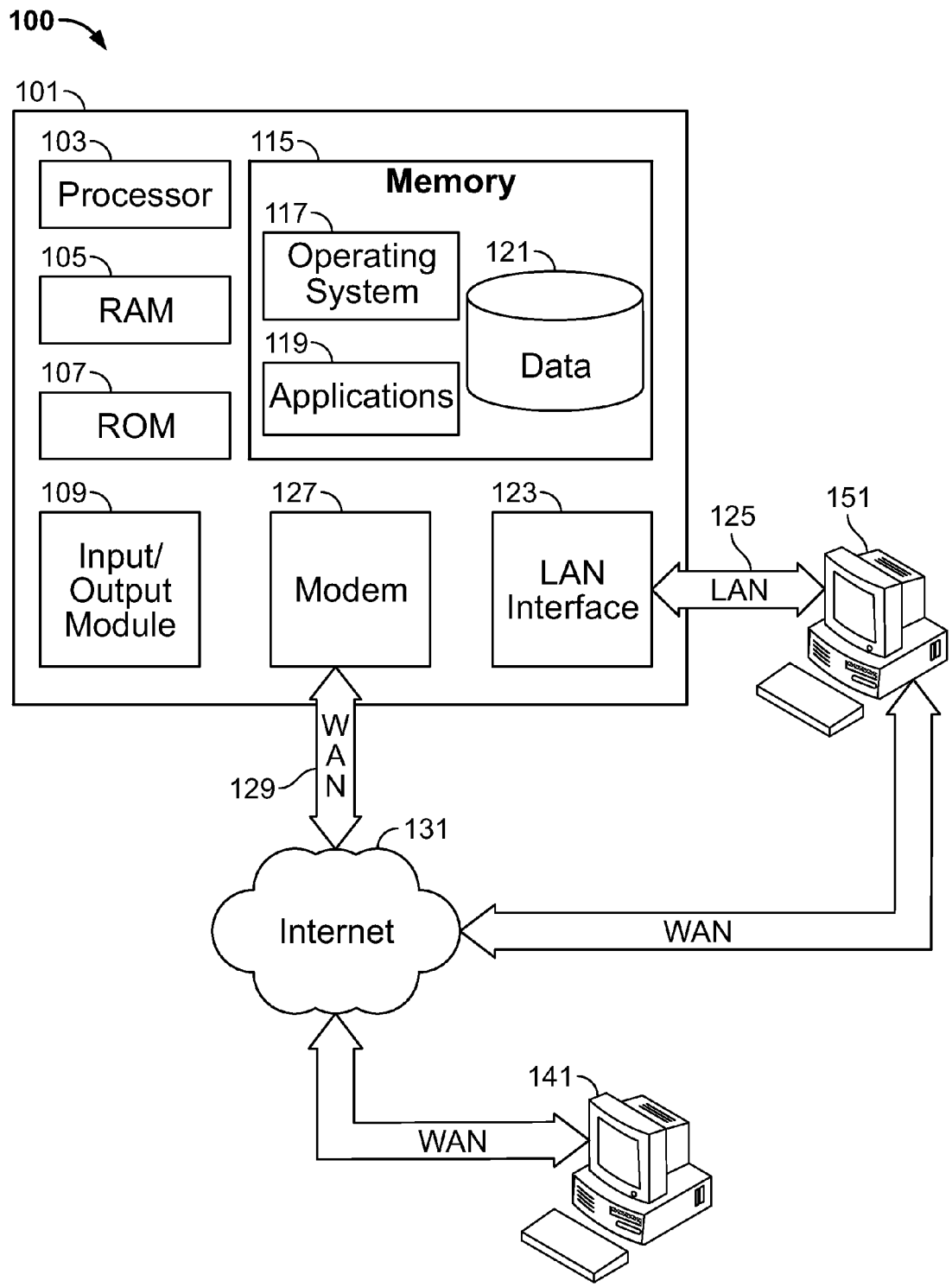
FIG. 1 illustrates a computing system in accordance with an aspect of the invention.

In the following description of various example embodiments of the invention, reference is made to the accompanying drawings, which form a part hereof, and in which are shown by way of illustration various example devices, systems, and environments in which aspects of the invention may be practiced. Additional specific arrangements of parts, example devices, systems, and environments may be utilized and structural and functional modifications may be made without departing from the scope of the present invention.

A. General Description of a System and Method of Managing Inventory

In general, as described above, aspects of the invention relate to managing inventory. In accordance with at least some aspects of the invention, a method of managing inventory may comprise: (a) identifying a first inventory of a customer, the first inventory having at least one asset, the asset having a stock keeping unit; (b) compiling historical data relating to the first inventory and a customer need; (c) creating a data file stored in a memory on a computer network, the data file containing at least the historical data relating to the first inventory and the customer need; (d) calculating a first quantity of the first inventory commensurate with meeting a first inventory need of the customer; and (e) reducing a cost of the first inventory based at least in part on the first inventory need.

A customer may be any seller of inventory and may be any entity that maintains a physical inventory. The inventory may be any physical or virtual goods. The inventory may be stored or maintained for a specific purchaser or may be stored as safety stock for general use among all or a portion of the customer's purchasers (e.g., a customer may buy ten widgets from a supplier for resale to a purchaser or may buy ten widgets from a supplier to keep as safety stock to prevent running out of widgets when a purchaser requests widgets). The customer may be any entity including, but not limited to, a supplier, a manufacturer, a wholesaler, a distributor, and a consumer. The inventory may be any quantifiable goods and may include such items as articles of manufacture, software, and cash.

The inventory may have one or more assets. An asset may be any item having value to a business. An asset may be identified by a stock keeping unit (hereinafter "SKU"). A SKU may be a unique identifier for each of the business' quantifiable goods. Each asset may have unique SKU. For example, a red widget may have a first SKU and a blue widget may have a second SKU that is different from the first SKU. Any widget having one or more differing features may have a different SKU to uniquely identify the widget and its unique features. An SKU may be numeric, alphanumeric, or any other unique identifying sequence of letters, numbers, and/or symbols.

For example, cash may be an asset. The cash may comprise paper and coins and may generally be referred to as "cash" for references purposes. Paper cash may have different denominations, including, but not limited to, $1, $5, $10, $20, $50, and $100. Coin cash may also have different denominations, including, but not limited to 1¢, 5¢, 10¢, 25¢, 50¢, and 100¢. Either or both of the paper cash and the coin cash may have a corresponding value that is equal to, less than, or greater than the face value of the cash. The cash may be valued in any suitable fashion. In this example, the cash may be the inventory and may be either paper or coins. The cash inventory may have a plurality of assets including, for example, $1, $5, $10, $20, $50, and $100 denominations. The denominations of the cash may be the SKU of the asset and may indicate one or more pieces of paper or coins may be of the same value.

Alternatively, each piece of paper cash may have a serial number that may be unique to each piece of paper cash. The serial number is often comprised of a series of alphanumeric digits that may indicate the location at which the paper cash originated, such as the Federal Reserve Bank that printed the paper cash. The serial number may also include digits or other identifiers that associate the paper cash with a batch or grouping of paper cash. Paper and coin cash may be created or printed by a mint or a printer, such as the Federal Reserve Bank. Most often, printing of cash and creation of coins is controlled by a country's government.

As described above, historical data may be compiled. The historical data may relate to the inventory and customer's needs. A history of the inventory may be useful in analyzing the current and future needs of the customer operating the inventory. The history of the inventory may relate to calculation of quantities of previous use of the inventory, a history of purchasing an asset having a particular SKU, the trends of the customer's need of the asset(s) and/or inventory (i.e., a month, a quarter, a year, and a decade), the cost of the inventory, the costs of maintaining and operating the inventory and/or assets, and the like. These calculations may be analyzed over a period of time such as a month, a quarter, a year, a season, a decade, and the like. The period of time may be any discrete, finite, or identifiable period of time.

The historical data may also include information relating to a customer's needs. The customer's needs may include objective and subjective business needs such as relationships with business partners or colleagues (e.g., new, prospective, or established relationships), comfort level with investment on behalf of the business, personnel staffing abilities, relationships with suppliers, distributors, and other necessary entities, international relations, governmental developments, such as changes in the laws and/or regulations, political changes, public policy concerns, and the like. Historical data may include any information relating to the business or inventory and is not limited to the aforementioned examples.

For example, a financial institution may monitor and record information relating to a customer's needs for cash. The financial institution may conduct periodic reports or perform periodic analysis, such as over the course of a day, a week, a month, a quarter, a year, a decade, and any other period of time. The financial institution may record the total amount of cash needed by a customer on a certain basis, such as weekly or daily. The financial institution may also record the quantity of denominations of cash, such as $1, $5, $10, $20, $50, and $100. The financial institution may store data relating to a period during a calendar or fiscal year in which the customer may frequently need more or less cash or denominations of cash. The financial institution may also store information relating to the growth rate of a customer. Some companies may expand and increase their inventory needs and other companies may downsize and decrease their inventory needs. Any trend relating to the customer's inventory needs or the customer may be compiled.

Inventory need may be calculated over a period of time such as a day, a week, a month, a quarter, and a year. The inventory need may be determined by any suitable factors such as economic changes or fluctuations, seasonal changes, business developments, and the like. The inventory need may include both subjective and objective factors.

A data file may be created that contains and stores the historical data relating to the inventory and the customer need. The data file may be stored in memory on a computer network, as described in greater detail below. The data file may contain any information relating to the inventory, the assets, the SKU, the historical data, the customer, the purchaser, and the customer need.

A quantity of the inventory may be calculated. The quantity may be commensurate with an inventory need of the customer. The quantity may identify the amount of inventory owed and/or maintained by the customer. The quantity may also represent a portion of the inventory (e.g., a quantity of an asset).

The quantity of the inventory may represent an amount of the inventory and/or the assets that meet the customer's inventory need. The inventory need may represent the quantity and/or types of inventory that are required by a purchaser or group of purchasers. The inventory need may represent a minimum amount of inventory under which the quantity and/or type of inventory may not go because of the risk of running out of inventory when a purchaser may place a request to purchase or otherwise obtain inventory.

Many subjective and objective factors may affect the quantity of inventory and/or assets that meet the customer's inventory needs. Subjective factors may include the level of risk that a business is willing to take in maintaining an inventory while balancing the capital that is available for investment purposes. The business may also increase the available inventory if the purchaser is new, a business relationship is undeveloped, a purchaser is demanding, or any other subjective factor that may relate to determining the quantity of the inventory and/or assets that may be maintained by a customer.

The objective factors that may affect the quantity of inventory and/or assets may include economic factors such as quantity of supply, level of demand for an inventory and/or assets, national and international laws or regulations that may affect the buying, selling, and purchasing of the inventory and/or assets, rates of inflation, and other economic factors. The objective factors may be quantifiable and may further include internal considerations of the business. The internal considerations may include development of an internal business strategy, decisions to purchase and/or acquire another business, success of the inventory and/or assets in the marketplace, and the like.

For example, a financial institution may monitor, track, or otherwise store information relating to a customer's inventory needs. The customer may need cash in the form of paper and/or coins. Typically, a customer will need cash to meet government laws and regulations, conduct daily financial transactions with purchasers, suppliers, distributors, etc., pay debts, and the like. The customer of a financial institution may be another financial institution or a large business entity that conducts high quantities of business each day. The financial institutions and large business entities may require that they have access to cash and denominations of cash each day to suitably conduct their business. The financial institution may provide the customers who are financial institutions and large business entities with the desired amount of cash.

The inventory may be associated with a cost. The cost may be costs associated with providing security to protect the inventory, costs associated with providing physical space and personnel for storing and handling the inventory, costs associated with maintaining the inventory, and the like. The costs associated with the inventory may be reduced based at least in part of the inventory need of the customer. The financial institution may consider the historical data and the customer needs in analyzing the quantity and/or type of inventory to maintain.

Oftentimes, the financial institution may wish to invest capital that may not be tied up as inventory or other safety stock. The financial institution may consider the historical inventory needs and customer business needs that may be required by a customer. The financial institution would like to invest as much capital as possible in an interest-bearing or "earning" asset and would like to reduce the amount of capital that is spent on dead or "non-earning" assets, such as inventory and other safety stock. By analyzing the historical data and customer needs, the financial institution may be able to reduce the amount of capital that may be required to sustain physical inventory and therefore increase the amount of capital that may be invested (e.g., earning money). By reducing the amount of capital spent on inventory needs, the earning potential of a financial institution's capital or cash/inventory increases.

The financial institution may calculate the amount of its capital that should be maintained in inventory by carefully considering the inventory needs of the customer. The quantity and types of inventory that would maximize a business' use of capital would apportion capital to the inventory that either equaled or slightly exceeded the amount of inventory that would be estimated to be needed by a customer. The closer the financial institution may be to reaching the optimal range or goal quantity and type of inventory, the more cash can be invested and earn additional capital.

For example, the financial institution may perform an analysis to determine the quantity and type of cash that a large corporate client may need during a single business day. A large corporate client may need $10 million, in which $1 million are in $1 denominations, $2 million are in $5 denominations, $1 million is in $10 denominations, $4 million in $20 denominations, $1 million in $50 denominations, and $1 million in $100 denominations to operate the necessary business transactions needing cash over a period of one business day. The financial institution may provide the total of $10 million, in the various aforementioned denominations, daily by delivering the cash to the large corporate client before the business transactions begin on the business day. Oftentimes, the cash may be delivered by an armored vehicle having guards and other security measures. The cash may be sent in any suitable fashion.

The delivery of the cash may be operated by the financial institution or "insourced" or may be operated by an external entity that is not directly governed by the financial institution. The financial institution typically retains ownership of the cash throughout the delivery process. During any portion of the movement and shifting location of the cash, the ownership of the cash most often remains with the financial institution, although ownership may change to another entity in some examples.

As explained in greater detail below, one or more inventories or portions of inventories may be consolidated, eliminated, or left unchanged. In some circumstances, consolidating inventory provided to two sources (such as two retail locations of a large corporate client) may decrease the amount of inventory that needs to maintained as a safety stock to prevent running out of an inventory or asset. In another example, a first inventory may be rearranged and apportioned to two new inventories, a second inventory and a third inventory. The reduction in cost to maintain the inventory, the shipping and operating costs, the delivery costs, and other maintenance costs may be reduced after determining the quantity and type of the inventory and the location from which the inventory may be shipped or sent.

For example, a financial institution may have a first inventory that is located at a first insourced location and a second inventory that is located at a second external location. The first insourced location may be operated by the financial institution and the second external location may be operated by an entity that is not owned and operated by the financial institution. The financial institution may make a decision to consolidate the second external location into the first insourced location so that the inventory (e.g., cash) may be dispersed to their customers from an insourced location that is operated by the financial institution. Specifically, the financial institution may analyze the supply of the cash from the first inventory and the second inventory and may determine that consolidating the inventory would produce less expense to maintain the inventory. The additional cash saved by consolidating the first and the second inventory would permit the financial institution to invest the "leftover" cash (the amount of cash saved by consolidating the first inventory and the second inventory).

Further, the first and the second inventory may be consolidated to form a consolidated inventory. A portion of the first inventory may be consolidated with the second inventory to form the consolidated inventory. A first inventory may be combined with a portion of the second inventory to form the consolidated inventory. A portion of the first inventory may be combined with a portion of the second inventory may be consolidated to form the consolidated inventory. Any number of additional inventories or portions of inventories may be combined in any suitable combination.

The first inventory may have a first cost and the second inventory may have a second cost. The first cost may be associated with the costs of maintaining, operating, managing, protecting, etc. the first inventory and the second cost may be associated with the costs of maintaining, operating, managing, protecting, etc. the second inventory. In the example explained above, a portion or the whole of the first inventory may be combined or consolidated at a third location. The third location may be physical located at the same location as the first location and/or the second location or may be at a remote location that is discrete from the first location and/or the second location. The first inventory and the second inventory are combined or consolidated at the third location to form a third inventory. The cost associated with maintaining the third location and the third inventory may be less than one or both of the first cost and the second cost.

During the consolidation of two or more inventories, a portion or whole of an inventory may be eliminated. Elimination may include no longer making the inventory available. For example, an asset of the inventory may no longer be manufactured and the asset may no longer be made available for distribution. In another example, the inventory may be consolidated and may be reduced in quantity due to improvement in cost-effective maintenance of the inventory. In this case, a smaller quantity of inventory may be needed to sustain the same quantity of business for customers, such as financial institutions.

The first inventory may be positioned at a first location and the second inventory may be positioned at a second location that is different from the first location. The first location and the second location may be positioned at the same physical location or at a location near one another. The first and second location may be physically located at locations far apart. In another example, the first inventory and the second inventory may be positioned at the same physical location.

Inventory may be consolidated from any location that may be maintained and operated by the financial institution or another entity. Any portion of the inventory (including the entire inventory) may be consolidated, eliminated, or reduced, based on the inventory needs amount of costs saved by maintaining a lower quantity (and more efficient and effective quantity) of inventory.

The method of managing inventory may also comprise generating a report that may contain the historical data relating to the inventory and the customer need. The report may include analysis of the historical data and the customer need and may provide suggested solutions for reducing the cost of the inventory based at least partly on the historical data and the customer need.

The data file may be updated with the information that is generated in the report. For example, the report may include information relating to a recent consolidation of inventory and the costs associated with reducing the inventory and the respective costs. The information in the report may be incorporated into the data file and the data file may represent the most current information relating to the inventory, the costs associated with the inventory, and the customer needs.

A report may be generated on a periodic basis and may be generated either automatically or manually. The report may be generated once per day, week, month, quarter, season, year, or any other quantifiable period of time. The report may also be generated upon request such as when a customer like a financial institution may be considering consolidating, eliminating, or reorganizing inventory for any suitable reason. The data file may be update immediately after a change in inventory or at any time thereafter.

In another example, a method of managing cash may comprise: (a) calculating a first inventory having a first quantity of cash for a first location and a second inventory having a second quantity of cash for a second location; (b) identifying an optimum inventory having an optimum quantity of the cash, the optimum quantity being less than the first quantity and less than the second quantity; (c) calculating an optimum quantity of the cash for maintaining the optimum inventory; and (d) maximizing a value of the cash stored at the first location and the second location by permitting the first location and the second location to access the optimum quantity of the cash.

The optimum inventory may be a cost-effective inventory. The optimum inventory may be maintained and operated by the financial institution and/or another entity. The optimum inventory may be a range of quantities and types of inventory and/or assets. The optimum inventory may be updated by the report of new data, as described above. The optimum inventory may be influenced by subjective and objective factors, including, but not limited to business developments.

The optimum inventory may have an optimum quantity of the cash. The optimum quantity may be less than the first quantity and less than the second quantity. The optimum quantity may be less than the first quantity and the second quantity and may help to decrease the cost associated with maintaining the inventory. The optimum quantity may be calculated by any suitable means, including considering historical data relating to the inventory and by considering customer needs.

The value of the cash that is stored at the first location and the second location may be maximized. The maximization may be accomplished by permitting the first location and the second location to access the optimum inventory. The maximization may also include consolidating the first inventory and the second inventory and permit the inventory needs associated with the first inventory and the second inventory to obtain inventory from the optimum inventory.

A first value may be associated with the difference between the first quantity of cash and the optimum quantity of cash. In essence, the first value is at least a portion of the cost savings generated by consolidating, eliminating, or otherwise reorganizing the inventory and the locations storing the inventory.

The optimum cost of maintaining the optimum inventory may be less than a first cost of maintaining the first inventory and/or may be less than a second cost of maintaining the second inventory. In many examples, the optimum cost will represent a streamlined, more cost-effective method and system of providing inventory and assets to customers, such as a financial institution.

The value may be used by the financial institution or customer in any suitable manner. For example, the value may be invested. The investment may be invested back in the customer (e.g., purchasing new equipment, hiring new personnel, or otherwise improving the internal structure of the business) or may be invested in external investments. The external investments may earn revenue and generate additional capital for the customer or financial institution. The external investments may be in the form of stocks, bonds, mutual funds, loans, real estate, or other investments that may appreciate.

The first inventory, the second inventory, and the optimum inventory may comprise a first cash denomination having a first quantity and a second cash denomination have a second quantity. The first denomination may be any one of or a combination of $1, $5, $10, $20, $50, and $100 and the second denomination may be any one of or a combination of $1, $5, $10, $20, $50, and $100. Each denomination may have an optimum quantity or range of quantities that would provide cost-effective management of the inventory.

An optimum cost of maintaining the optimum inventory may be less than a first cost of maintaining the first inventory and a second cost of maintaining the second inventory. The optimum cost reduces the operating and maintenance costs of the inventory and results in greater utilization of inventory and capital.

A cash handling system may comprise a computing device, a server, and a processor. The computing device may receive data relating to an amount of cash that may be stored at a location and may also receive data relating to the amount of cash that may be stored at a location. The server may comprise memory and the memory may store the data in a data file. The processor may execute computer executable instructions that perform a method comprising: (a) calculating a first inventory having a first quantity of cash for a first location and a second inventory having a second quantity of cash for a second location; (b) identifying an optimum inventory having an optimum quantity of the cash, the optimum quantity being less than the first quantity and less than the second quantity; (c) calculating an optimum quantity of the cash for maintaining the optimum inventory; and (d) maximizing a value of the cash that may be stored at the first location and the second location by permitting the first location and the second location to access the optimum quantity of the cash.

B. Specific Examples of the Invention

The various figures in this application illustrate examples of a system and method of managing inventory. When the same reference number appears in more than one drawing, that reference number is used consistently in this specification and the drawings to refer to the same or similar parts throughout.

FIG. 1 illustrates an example of a computing system environment 100 that may be used according to one or more embodiments of the invention. The computing system environment 100 is only one example of a suitable computing environment and is not intended to suggest any limitation as to the scope of use or functionality of the invention. The computing system environment 100 should not be interpreted as having any dependency or requirement relating to any one or combination of the illustrated components.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, the computing system environment 100 may include a computer 101 having a processor 103 for controlling overall operation of the computer 101 and its associated components, including RAM 105, ROM 107, an input/output module or BIOS 109, and a memory 115. The computer 101 typically includes a variety of computer readable media. The computer readable media may be any available media that may be accessed by the computer 101 and may include both volatile and nonvolatile media and removable and non-removable media. By way of example, and not limitation, computer readable media may comprise computer storage media and communication media.

Computer storage media may include volatile and nonvolatile and removable and non-removable media implemented in any method or technology for storage of information such as computer readable instructions, data structures, program modules, or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, and any other medium that can be used to store the desired information and that can be accessed by the computer 101.

Communication media may embody computer readable instructions, data structures, program modules, and/or other data in a modulated data signal such as a carrier wave or other transport mechanism. It may also include any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. Although not shown, RAM 105 may include one or more applications representing the application data stored in RAM 105 while the computer is on and corresponding software applications (e.g., software tasks) are being executed.

The input/output module or BIOS 109 may include a microphone, keypad, touch screen, and/or stylus through which a user of the computer 101 may provide input. The input/output module or BIOS 109 may also include one or more of a speaker for providing audio output and a video display device for providing textual, audiovisual, and/or graphical output.

Software may be stored within memory 115 and/or storage to provide instructions to the processor 103 for enabling the computer 101 to perform various functions. For example, the memory 115 may store software used by the computer 101, such as an operating system 117 and an associated data file 121. Alternatively, some or all of the computer executable instructions for the computer 101 may be embodied in hardware or firmware (not shown). As described in detail below, the data file 121 may provide centralized storage of the inventory management.

The computer 101 may operate in a networked environment that supports connections to one or more remote computers, such as computing devices 141 and 151. The computing devices 141 and 151 may be personal computers or servers that include many or all of the elements described above relative to the computer 101. The network connections depicted in FIG. 1 may include a local area network (LAN) 125 and a wide area network (WAN) 129 and may also include other networks. The computer 101 is connected to the LAN 125 through a network interface or adapter 123. The computer 101 may be a server and may include a modem 127 or other means for establishing communications over the WAN 129. For example, the computer 101 may connect to a WAN 129 such as the Internet 131 through a modem connection. The network connections may include any communications link between computers.

The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program may be used by the computer 101 according to an embodiment of the invention. The application program may include computer executable instructions for invoking user functionality related to communication, such as email, short message service (SMS), and voice input and speech recognition applications.

The computing devices 141 or 151 may also be mobile terminals including various other components, such as a battery, speaker, and antennas (not shown). The input/output module or BIOS 109 may include a user interface including such physical components as a voice interface, one or more arrow keys, joystick, data glove, mouse, roller ball, touch screen, or the like.

Each of the plurality of computing devices 141, 151 may contain software for creating a data file 121. The software may be a set of detailed computer-executable instructions for the computing devices 141, 151. The software may provide the computing devices 141, 151 with the ability to create a data file 121. The data file 121 may contain multiple individual files of information. For example, if a plurality of inventory may be managed and information relating to each inventory may be received onto a computer network. The information relating to each inventory may be separately contained in a unique data file 121. One or more of the data files relating to a plurality of inventories may be coupled to each other in any suitable fashion.

The computer 101 may include memory 115 for storing computer-readable instructions and a processor 103 for executing the computer-executable instructions. The computer-executable instructions may be data in the form of program source code that may be capable of modifying the data file 121. The computer-executable instructions may be a series or sequence of instructions for a computing device that is typically in the form of a programming language such as C++, Java, SQL, or the like. Various computer programming languages may be used to create the computer-executable instructions, and the invention is not limited to the programming languages listed above.

The memory 115 may be a portion of the computer 101 that stores data or other instructions. The memory 115 may be retained or lost when power is lost to the system. The memory 115 may provide access to data for a user or computing device 141, 151 to revise and manage a data file 121.

The processor 103 may be capable of executing the computer-executable instructions. The computer-executable instructions may be executed by the processor 103 after they have been stored in the memory 115. The processor 103 may be a centralized element within a computing system that is capable of performing computations. For example, the processor 103 may perform the computations that are described in the computer-executable instructions and then execute the computer-executable instructions. The computer-executable instructions may include data describing changes to the data file 121 that were made by a user or computing device 141, 151 over a computer network such as the Internet 131. The server 101 stores the data in the data file 121 that may be associated with an inventory. The data file 121 may be stored in the memory 115 so that it may be accessible to a plurality of computing devices 141, 151 and/or users.

Data relating to an inventory may be stored in the data file 121. Security precautions may be implemented to prevent unauthorized access to the data file 121. A user identification and a password may be required to access the data file 121 and/or the data relating to inventory management. Some of the data that is stored in the data file 121 may be shared between multiple data files. Any desirable security precautions may be implemented.

The computer-executable instructions may be a series or sequence of instructions for a computing device 141, 151, described in detail throughout this disclosure. The processor 103 may be configured to execute the computer-executable instructions that may be used to manage inventory. Such computer-executable instructions may be located (e.g., physically or logically) in modules in the memory 115. The computer network 131 may be any network that interconnects users and/or computing devices 141, 151. According to at least one aspect of the invention, the computer network 131 may provide shared access by two computing devices to at least a portion of the data in the plurality of modules. Shared access may be two or more computing devices 141, 151 that may be coupled to the computer network 131 and/or that may be able to communicate with each other and/or access, change, and add data to a data file 121.

A computer network such as the Internet 131 provides access to the date file 121 that may be shared between the computing devices 141, 151. Additionally, the computer network may be public or private and may be wired or wireless. The computing devices 141, 151 that are coupled to the computer network may be any electronic device that is capable of connecting to a computer network and transmitting data over the computer network. Further, the computing devices are capable of receiving data for entry into a data file 121 that may be associated with management of an inventory.

Figure 2A:
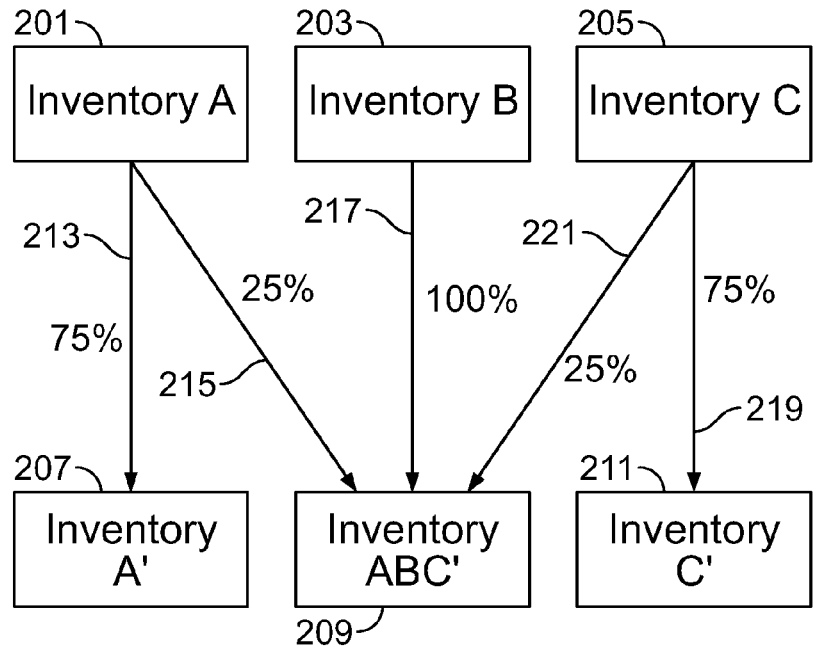
FIGS. 2A-2E illustrate flowcharts for managing a plurality of inventory, in accordance with an aspect of the invention.

FIGS. 2A-2E illustrate examples of consolidating at least a portion of two or more inventories. In FIG. 2A, inventory management may include Inventory A 201, Inventory B 203, and Inventory C 205. A first portion of Inventory A 213 may represent 75% of Inventory A. A second portion of Inventory A 215 may represent 25% of Inventory A. The entire inventory of Inventory B 217 may represent 100% of Inventory B. A first portion of Inventory C 221 may represent 25% of Inventory C and a second portion of Inventory C 219 may represent 75% of Inventory C. The first portion of Inventory A 213 may comprise Inventory A' 207 and the second portion of Inventory A 215 may comprise Inventory ABC' 209. Inventory B 203, 217 and the first portion of Inventory C 221 may be included in Inventory ABC'. Inventory C' 211 may include the second portion of Inventory C 219.

Figure 2B:
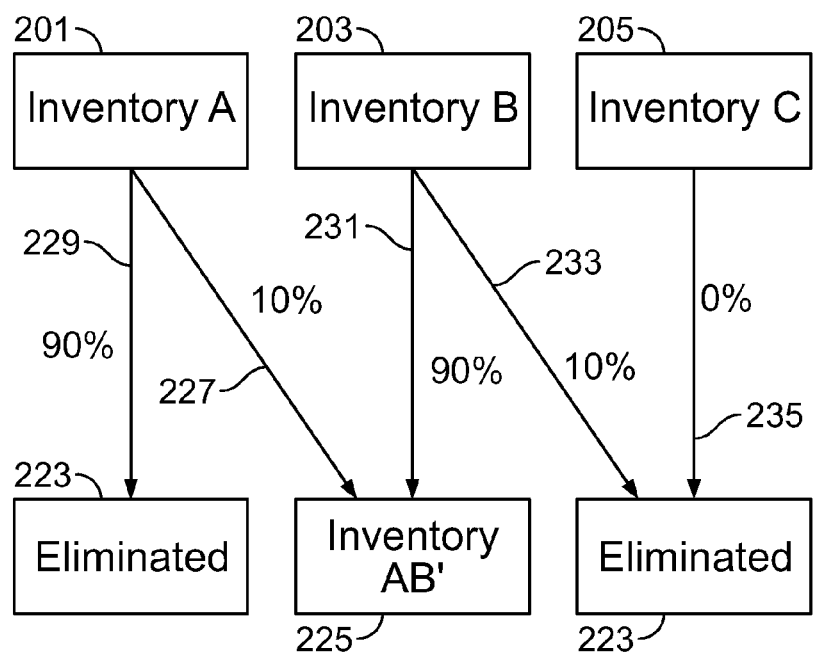

FIG. 2B illustrates an example of the invention comprising Inventory A 201, Inventory B 203, and Inventory C 205. Inventory A 201, Inventory B 203, and Inventory C 205 may be consolidated. For example, Inventory A 201 may comprise a first portion of Inventory A 229 that represents 90% of Inventory A and a second portion of Inventory A 227 may represent 10% of Inventory A. Inventory B 203 may have a first portion 231 that represents 90% of Inventory B and a second portion 233 that represents 10% of Inventory B. Inventory C may be eliminated 223 and 0% of Inventory C 235 may be utilized in the consolidated inventory. A first portion of Inventory A 229 may also be eliminated 223 and may not be used in the consolidated inventory. A second portion 233 of Inventory B may be eliminated in the consolidated inventory.

Inventory AB' 225 may be created from a consolidated of the second portion of Inventory A 227 and the first portion of Inventory B 231. Inventory AB' 225 may represent the consolidated inventory that may be necessary to service the customer (and financial institutions) that were previously serviced by Inventory A 201, Inventory B 203, and Inventory C 205. Inventory AB' 225 may be a reduced quantity of inventory and may provide a more efficient distribution of inventory that still meets the needs of the customers (and financial institutions). Inventory AB' 225 may have a lower cost of maintaining, operating, owning, etc. the inventory and may also be operated by an insourced location or an external location. The insourced location may be operated by the customer or financial institution and the external location may be operated by an entity outside of the customer or financial institution.

Figure 2C:
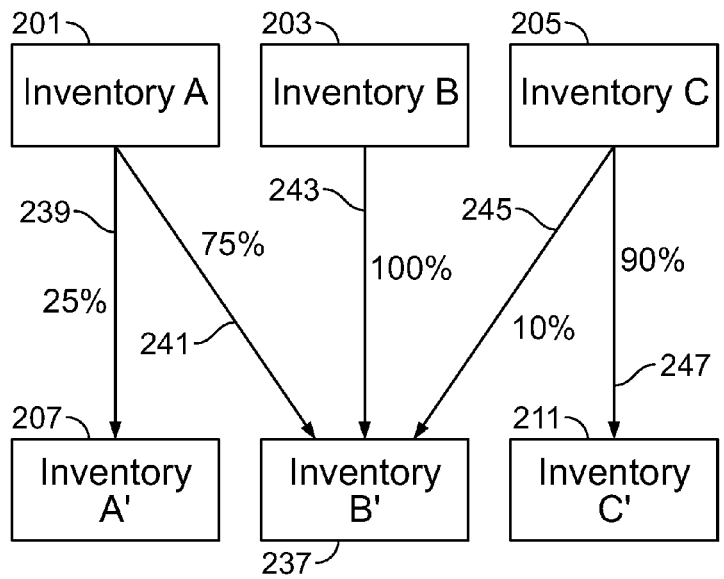

FIG. 2C illustrates another embodiment of consolidating inventory. Inventory A 201, Inventory B 203, and Inventory C 205 may be consolidated and reorganized/rearranged. A first portion of Inventory A 239 may represent 25% of the inventory of Inventory A and may be reorganized to comprise 100% of Inventory A' 207. A second portion of Inventory A 241 may represent 75% of Inventory A and may be combined with 100% of Inventory B 243 and a first portion of Inventory C 245 (that represents 10% of Inventory C) to create Inventory B' 237. A second portion of Inventory C 247 may represent 90% of Inventory C and may be reorganized to comprise the whole of Inventory C' 211.

Figure 2D:
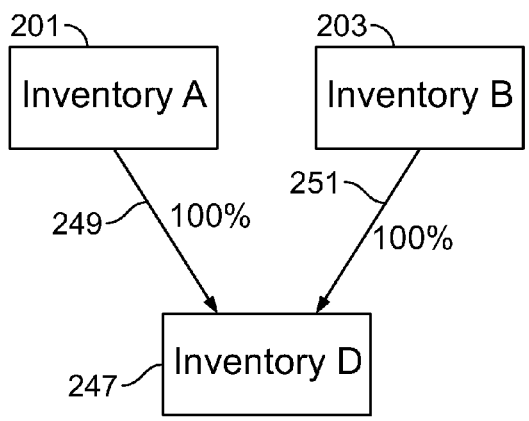

In yet another example illustrated in FIG. 2D, Inventory A 201 and Inventory B 203 may be wholly combined to create Inventory D 247. In this case, 100% of Inventory A 249 and 100% of Inventory B 251 are combined to create Inventory D. Inventory A 201 may represent a cash vault in a first city and Inventory B 203 may represent a cash vault in a second city. Upon determining the optimum quantity of cash and the best location at which to store the cash, the inventory may be more efficient and cost-effective to create a new cash vault, Inventory D 247 in a new city that is capable of servicing both the city in which Inventory A was originally stored and the city in which Inventory B was originally stored.

Figure 2E:
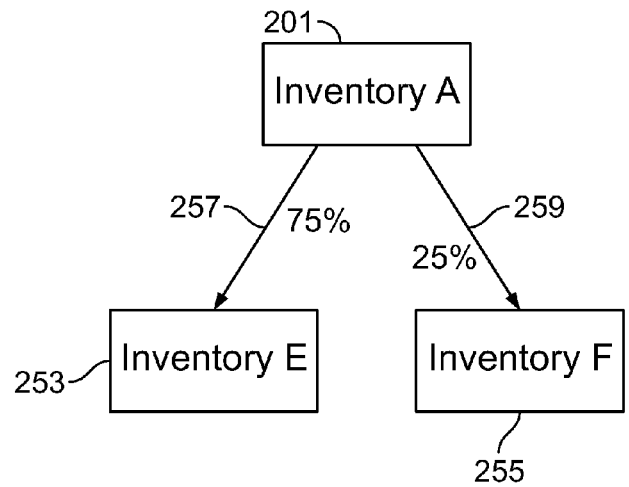

FIG. 2E illustrates a reorganization of Inventory A 201 to create Inventory E 253 and Inventory F 255. A first portion of Inventory A 257 may represent 75% of Inventory A and may be reorganized to represent the whole of Inventory E 253. A second portion of Inventory A 259 may represent 25% of Inventory A and may comprise the whole of Inventory F 255. In some situations, the most cost-effective and efficient structure would include reorganizing one inventory (e.g., Inventory A 201) into one or more smaller inventories (e.g., Inventory E 253 and Inventory F 255). The locations of Inventory E 253 and Inventory F 255 may be the same as Inventory A 201. Alternatively, the locations of Inventory E 253 and Inventory F 255 may be at a new location that is different than the location of Inventory A 201. Inventory E 253 and Inventory F 255 may be at the same location or may be at different locations. The number of inventories to analyze is not limited to changes to one, two, or three sites, but may also consider the plurality of combinations of site comparisons.

Figure 3:
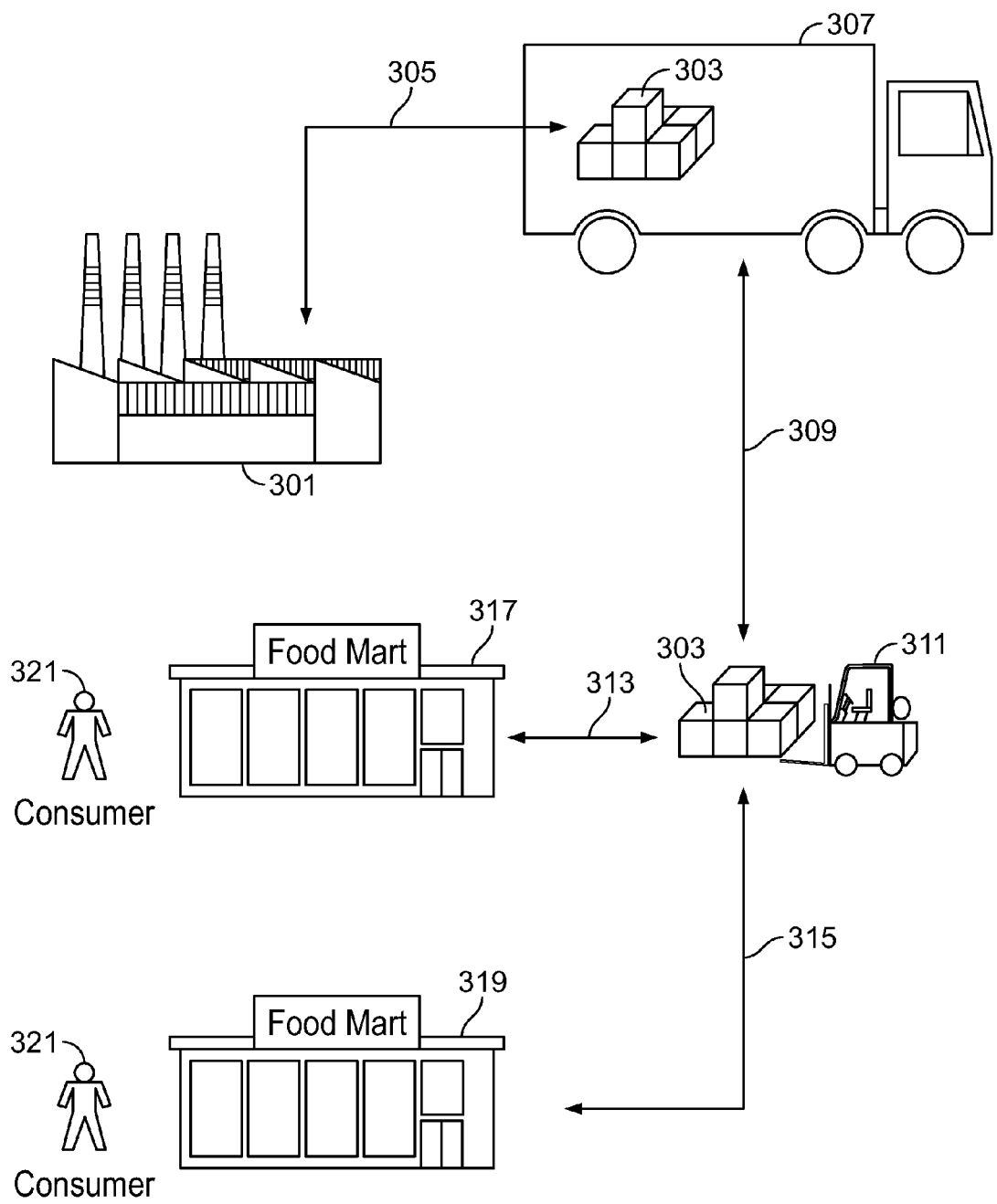
FIG. 3 illustrates an inventory management system, according to an aspect of the invention.

Referring now to FIG. 3, inventory management may include several steps. The inventory 303 may be stored and maintained at a location 301, such as a warehouse or other storage area. The inventory may be transported 305 to a shipping or sending mechanism 307. The shipping mechanism 307 may be a vehicle or other means of transporting inventory. The shipping mechanism 307 may transport the inventory 309 to a point of distribution 311. The point of distribution 311 may be transported to purchasers 313, 315 at one or more locations 317, 319 at which the inventory 303 may be available to a consumer 321 or other purchaser. A location 301 may be any manufacturer, distributor, supplier, wholesaler, etc. that may cause inventory to be distributed or supplied to other entities.

Figure 4:
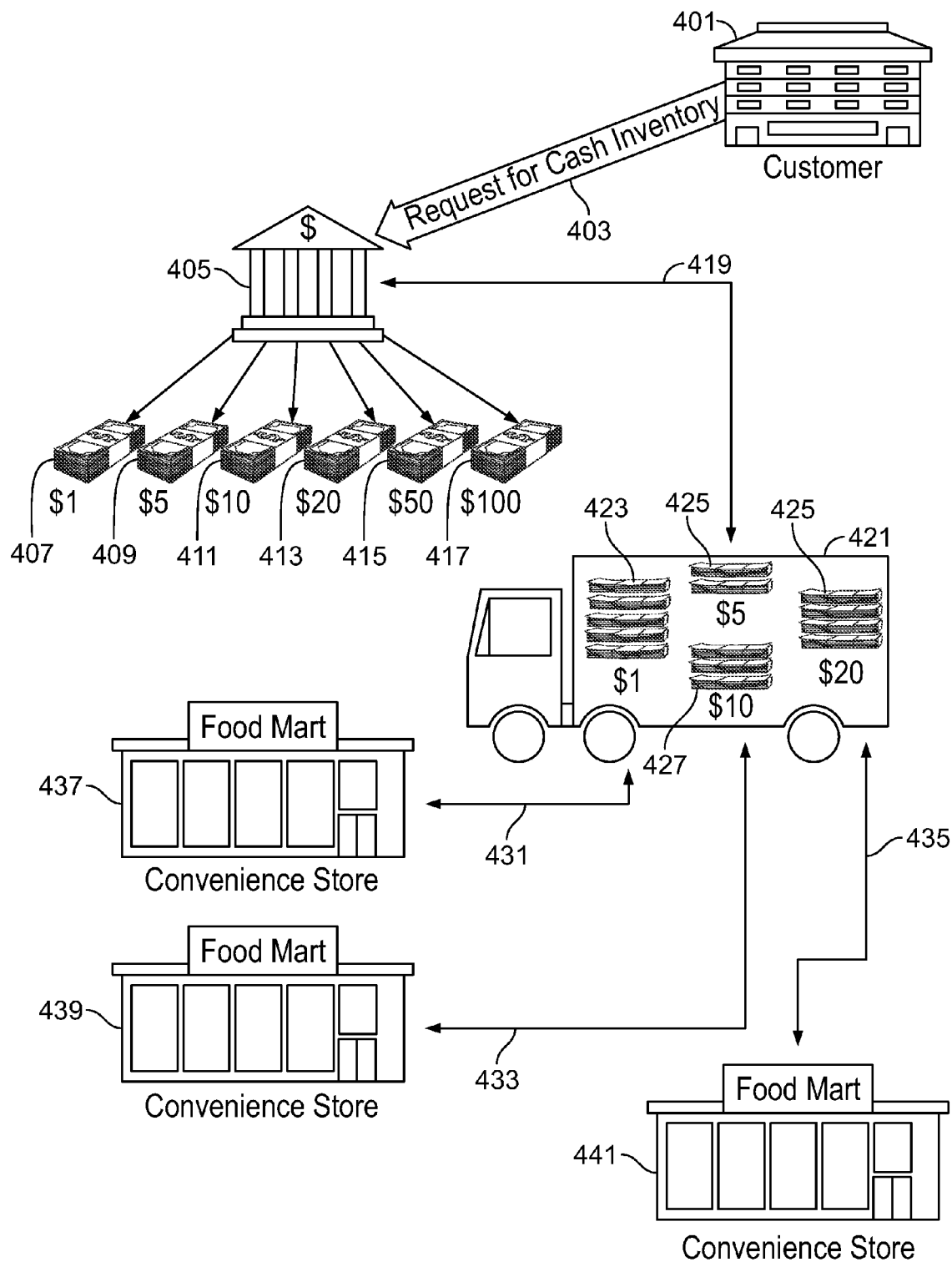
FIG. 4 illustrates a cash vault management system, in accordance with an aspect of the invention.

The point of distribution 311 may distribute the inventory to a first location 317 and a second location 319. The first location 317 and the second location 319 may be owned and operated by a customer such as a financial institution at location 301. FIG. 4 illustrates inventory management in a financial institution. A financial institution 405 may have a customer 401 that makes a request for cash 403. The financial institution 405 may store cash and the cash may have a plurality of denominations, such as $1 407, $5 409, $10 411, $20 413, $50 415, and $100 417. The request for cash inventory 403 from the customer 401 may include a quantity of cash having a plurality of denominations (or assets).

For example, the customer 401 may be a large corporate retailer. The customer may wish to transport 419 a quantity of cash to three of its stores, a first store location 437, a second store location 439, and a third store location 441. An armored vehicle 421 or other transportation mechanism may transport the cash to the store location 437, the second store location 439, and the third store location 441. In this example, the financial institution 405 provides cash to each of the three stores location 437, 439, and 441. In other examples, the financial institution 405 may provide cash to additional store locations based at least in part on the cash needs of the customer. Any suitable transportation mechanism may be utilized.

The inventory may comprise a plurality of denominations (or assets). The customer request for cash inventory 403 may include a request for five stacks of $1 423, two stacks of $5 425, three stacks of $10 427, and four stacks of $20 425. The customer 401 may request these specific denominations to provide adequate physical cash for carrying out business transactions at each store location 437, 439, and 441.

Figure 5:
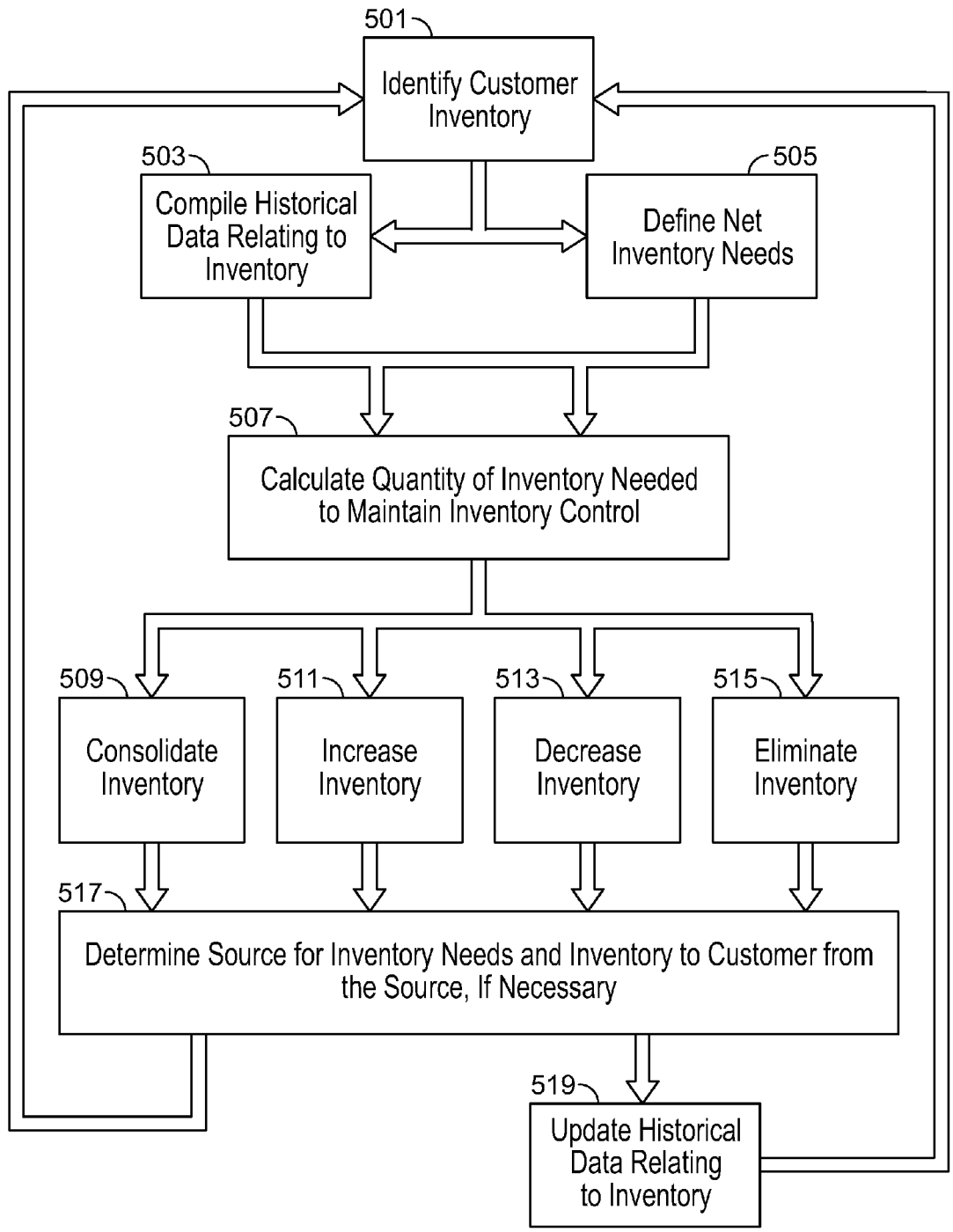
FIG. 5 illustrates a method of managing inventory, in accordance with an aspect of the invention.

FIG. 5 illustrates a method of inventory management that comprises the steps of: (a) identifying customer inventory; (b) compiling historical data relating to the inventory; (c) defining net inventory needs; (d) calculating a quantity of the inventory needed to maintain inventory control; (e) consolidating inventory; (f) increasing inventory; (g) decreasing inventory; and (h) eliminating inventory. The customer inventory may be identified at step 501 and may be any customer need inventory. The customer may be a financial institution and the inventory may be cash.

As illustrated in step 503, historical data relating to the inventory may be compiled. Historical data may include any data relating to inventory need, customer needs, business developments, and the like, as described in greater detail above. A net inventory need may be defined at step 505. The net inventory need may be the difference between the outgoing cash and the incoming cash for a financial institution or business. The net inventory need may vary significantly from day to day, week to week, month to month, and year to year (or any other quantifiable period of analysis). Maintaining a large inventory to provide for the net inventory need eliminates the risk of inventory shortages. For example, if a financial institution stores cash totally greater than the inventory needs of its customers, then no risk exists for a shortage of cash.

However, the costs associated with holding the cash is an opportunity to obtain a return from investing the cash over the period of time in which the cash is stored (and not being invested). A cash handling and management system may facilitate the process of balancing a risk of shortage and providing a high rate of return on investment. By properly balancing the risk of shortage with the investment opportunities, the use of the cash may be maximized and the business will obtain additional capital.

The net inventory needs may be defined by net usage of inventory during a first period and a second period. Each period of net usage may have a mean and standard deviation calculated to measure the dispersion of a frequency distribution of the inventory needs. The inventory identified in step 501 may correspond to the inventory that may be maintained at a particular location. This inventory may have a mean and a standard deviation. An instantaneous management efficiency may be equal to the difference between the maintained inventory and the mean of the net usage of inventory divided by the standard deviation value of the net usage. The instantaneous management efficiency may represent the amount of inventory that may be stored in excess of the expected net usage.

A mean management efficiency may represent the average excess of inventory over the expected net usage. This may be mathematically represented by dividing the difference between the mean net inventory and the maintained inventory that may be calculated over a first period of time by the standard deviation of the net usage of inventory. The instantaneous efficiency coefficient illustrates the performance over a period of time (such as a day) and the mean efficiency coefficient measures the inventory management over the analyzed time horizon.

By keeping the instantaneous management efficiency and the mean management efficiency low, the cost of lost opportunity for investing cash decreases, but the risk of shortages of cash increases. An optimum value of the instantaneous management efficiency and the mean management efficiency may be the smallest possible value such that the risk of inventory (cash) shortage is below a threshold. For example, a threshold of 2.3% may be determined to be an acceptably low risk of inventory or cash shortage. The 2.3% threshold may correspond to a management efficiency of 2. The inventory may be maintained at a quantity of at least two standard deviations above the mean net usage.

The optimum efficiency may be denoted by maintaining the inventory level at a quantity that is equal to the mean management efficiency added to the value of the optimum efficiency multiplied by the standard deviation of a period (such as a first period or a day) of net inventory usage. Levels exceeding the optimum efficiency represent lost opportunity for investment of the inventory (e.g., maintaining an inventory that is greater than the quantity of inventory needed to sustain the inventory needs). Therefore, the cost of lost opportunity for investment may be defined as the difference between the instantaneous management efficiency and the optimum management efficiency, the difference multiplied by the standard deviation of the net usage period and the overnight interest rate at which the excess cash can be invested. Ideally, the difference between the instantaneous management efficiency and the optimum efficiency would remain as small as possible. By analyzing the measures of inventory management described above, the current inventory management practices and methods may be analyzed.

The inventory efficiency measures described above concern a single inventory location or cash vault. This analysis may be extended to evaluate the inventory policy of a plurality of vaults. For example, a first cash vault, a second cash vault, and a third cash vault have a first standard deviation, a second standard deviation, and at third standard deviation, respectively. The instantaneous management efficiency of the plurality of the first cash vault, the second cash vault, and the third cash vault may equal the instantaneous management efficiency of the first cash vault multiplied by the standard deviation of the first cash vault added to the instantaneous management efficiency of the second cash vault multiplied by the standard deviation of the second cash vault which is also added to the instantaneous management efficiency of the third cash vault multiplied by the standard deviation of the third cash vault; the total may be divided by the standard deviation of the combined net usage of the first cash vault, the second cash vault, and the third cash vault to define the optimum efficiency. The standard deviation of the combined net usage of the first cash vault, the second cash vault, and the third cash vault may be calculated theoretically and/or empirically. Any number of cash vaults may be considered.

The efficiency measures for a plurality of cash vaults permits a comparison of proposed efficiency solutions with the current method of inventory management. For example, 42 cash vaults may be currently receiving inventory from cash vault A and cash vault B. The 42 cash vaults may need to be reassigned. The 42 vaults may comprise 30% of cash vault A's cash volume. If cash vault B comprise at least a portion of the cash to the 42 vaults, the cash volume needs would decrease at cash vault A and decrease the costs at cash vault A. If properly balanced, the reorganization of the flow of cash and supply of cash may help to reduce the costs associated with maintaining the cash and operating the cash flow, as described in great detail above.

In another example, cash vault A, cash vault B, and cash vault C may be consolidated into a mega-cash vault. The inventory management efficiency coefficient of the new vault may be computed and compared to the efficiency of the current configuration. The difference will illustrate the effect of consolidation on the cost of inventory.

Referring again to FIG. 5, the quantity of inventory that may be needed to maintain inventory control may be calculated at step 507. The quantity of inventory that may be needed may be calculated or analyzed as described above to determine an efficient, cost-effective structure. Once the quantity of needed inventory is calculated, the inventory may be consolidated at step 509, the inventory may be increased at one or more locations, as in step 511, the inventory may be decreased at one or more locations, as in step 513, and/or the inventory may be eliminated as illustrated in step 515. The inventory that may be eliminated 515 may represent the excess inventory from the consolidated or reorganization of the inventory and the excess inventory may be invested. The source or locations of the inventory needs may be determined and the inventory may be sent to the customer from the source or location, if needed, as in step 517. The historical data relating to the inventory may be updated 519, as described above.

Figure 6:
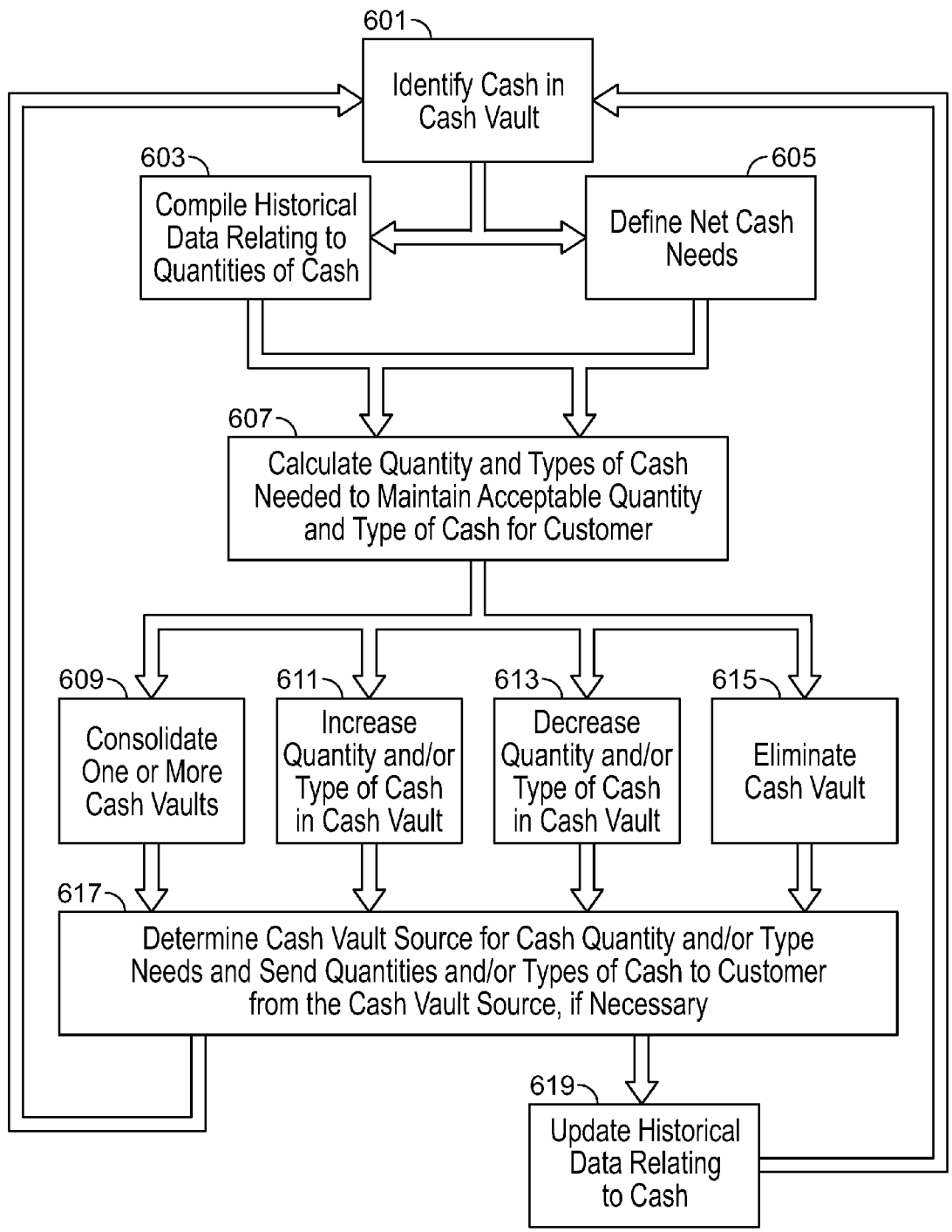
FIG. 6 illustrates a method of managing cash and cash vaults, according to an aspect of the invention.

FIG. 6 illustrates a method of managing inventory, where the customer is a financial institution and the inventory is cash stored at a cash vault. The quantity of the cash in the customer cash vault may be identified at step 601. The historical data relating to the quantities of cash at the cash vaults may be compiled at step 603. The net cash needs may be defined at step 605. The quantity and types or denominations of cash needed to maintain acceptable quantities and types or denominations of cash may be calculated for a customer, as in step 607. The quantity and types of denominations may be calculated by evaluating the efficiencies, as described in detail above.

The cash may be consolidated from one or more cash vaults into a few number of cash vaults at step 609. The quantity and/or type of cash in the cash vaults may be increased, as illustrated in step 611. The quantity and/or type of cash in the cash vaults may be decreased, as illustrated in step 613. A cash vault may be eliminated or closed, as in step 615. The cash vault source may be determined at step 617. The cash vault source may be the cash vault that distributes, send, or processes cash needs of a customer when and if needed. The data file may be updated to reflect the new historical information relating to a cash vault 619 at any time.

Aspects of the invention have been described in terms of illustrative embodiments thereof. Numerous additional embodiments, modifications, and variations may exist that remain within the scope and spirit of the appended claims. For example, the steps illustrated in the figures may be performed in other than the recited order and that one or more steps illustrated may be optional. The methods and systems of the above-referenced embodiments may also include other additional elements, steps, computer executable instructions, or computer-readable data structures. In this regard, other embodiments are disclosed herein as well that can be partially or wholly implemented on a computer readable medium, for example, by storing computer executable instructions or modules or by utilizing computer readable data structures.

We claim:

1. A method of managing cash inventory, comprising:
   identifying, at a processor, a first cash inventory having at least one first cash denomination, the first-cash denomination having a stock keeping unit;
   compiling, at the processor, first historical data relating to the first cash inventory;
   defining, at the processor, a first net cash inventory need based on a difference between an outgoing amount of the first cash denomination from the first cash inventory and a first incoming amount of the first cash denomination from the first cash inventory;
   determining, at the processor, a first management efficiency of the first cash inventory based at least in part on the first net cash inventory need, the first management efficiency computed by calculating a difference between a first maintained inventory and a mean of a first net usage of the first cash inventory divided by a standard deviation of the first net usage;
   creating a data file stored in a memory on a computer network, the data file containing at least the first historical data relating to the first cash inventory, the first net cash inventory need, the first management efficiency, and the first net usage; and
   calculating, at the processor, a first quantity of the first cash inventory based at least in part on the first net usage of the first cash inventory, wherein the first quantity reflects a quantity needed to sustain the needs of the first cash inventory.

2. The method of claim 1, further comprising generating a report containing at least the first net usage.

3. The method of claim 1, further comprising:
   identifying a second cash inventory, the second cash inventory having at least one second cash denomination, the second cash denomination having a stock keeping unit;
   compiling second historical data relating to the second cash inventory;
   defining a second net cash inventory need based on a difference between a second outgoing amount of the second cash denomination and a second incoming amount of the second cash denomination from the second cash inventory;
   determining a second management efficiency of the second cash inventory based at least in part on the second net cash inventory need, the second management efficiency computed by calculating a difference between a second maintained inventory and a mean of a second net usage of the second cash inventory divided by a standard deviation of the second net usage;
   storing in the data file, the second historical data relating to the second cash inventory, the second net cash inventory need, the second management efficiency, and the second net usage;
   calculating a second quantity of the second cash inventory based at least in part on the second net usage of the second cash inventory, wherein the second quantity reflects a quantity needed to sustain the needs of the second cash inventory.

4. The method of claim 1, further comprising the steps of:
   calculating a first optimum efficiency based at least in part on the first management efficiency; and
   reducing a first cost of maintaining the first cash inventory based at least in part on the first net usage and the first optimum efficiency.

5. The method of claim 4, wherein the step of reducing the first cost includes reducing a quantity of the first cash inventory.

6. The method of claim 3, wherein the first cash inventory is positioned at a first location and the second cash inventory is positioned at a second location different from the first location.

7. The method of claim 6, wherein maintenance of the first cash inventory has a first cost and maintenance of the second cash inventory has a second cost, and further comprising the step of:

combining the first cash inventory and the second cash inventory at a third location, wherein a cost of maintaining the combined first cash inventory and the second cash inventory at the third location is less than either the first cost or the second cost.

8. The method of claim 1, further comprising receiving inventory management input from a customer.

9. The method of claim 1, further comprising receiving inventory management input from an external entity.

10. The method of claim 1, wherein the first net cash inventory need is calculated over a period of time.

11. The method of claim 10, wherein the period of time is at least one of a day, a week, a month, a quarter, and a year.

12. An apparatus for managing cash, comprising:
a processor;
a memory having stored therein computer executable instructions that when executed cause the apparatus to:
calculate a first cash inventory having a first quantity of cash for a first location and a second cash inventory having a second quantity of cash for a second location;
determine a first net cash inventory need for the first cash inventory based on a difference between an outgoing amount of the first cash inventory and an incoming amount of the first cash inventory at the first location;
determine a first management efficiency of the first cash inventory based in part on the first net cash inventory need, the first management efficiency computed by calculating a difference between a first maintained inventory and a mean of a first net usage of the first cash inventory divided by a standard deviation of the first net usage;
determine a second net cash inventory need for the second cash inventory based on a difference between an outgoing amount of the second cash inventory and an incoming amount of the second cash inventory at the second location;
determine a second management efficiency of the second cash inventory based in part on the second net cash inventory need, the second management efficiency computed by calculating a difference between a second maintained inventory and a mean of a second net usage of the second cash inventory divided by a standard deviation of the second net usage;
identify an optimum cash inventory having an optimum quantity of the first cash inventory and the second cash inventory, the optimum quantity being less than a total of the first quantity and the second quantity, wherein the optimum cash inventory is based on the first net usage and the second net usage;
calculate an optimum quantity of each denomination of cash for maintaining the optimum cash inventory; and
maximize a value of the first cash inventory and the second cash inventory by consolidating the first cash inventory and the second cash inventory into a third cash inventory containing the optimum quantity of the cash.

13. The method of claim 12, further comprising calculating a first value associated with the difference between the first quantity of cash and the optimum quantity of cash.

14. The method of claim 13, wherein the first value is invested.

15. The method of claim 12, wherein an optimum cost of maintaining the optimum cash inventory is less than a total of a first cost of maintaining the first cash inventory and a second cost of maintaining a second cash inventory.

16. The method recited in claim 4, wherein the step of reducing the first cost of the first cash inventory includes decreasing the first quantity of the first cash inventory.

17. The method recited in claim 3, further comprising the step of comparing the first management efficiency and the second management efficiency.

18. The method recited in claim 17, further comprising the step of reducing a cost of the first cash inventory and the second cash inventory by decreasing at least one of the first quantity or the second quantity based at least in part on the comparison of the first management efficiency and the second management efficiency.

19. The method recited in claim 17, further comprising the step of reducing a cost of the first cash inventory and the second cash inventory by consolidating the first cash inventory and the second cash inventory based at least in part on the comparison of the first management efficiency and the second management efficiency.

20. The method recited in claim 17, further comprising the step of reducing a cost of the first cash inventory and the second cash inventory by eliminating one of the first cash inventory or the second cash inventory based at least in part on the comparison of the first management efficiency and the second management efficiency.

21. The method recited in claim 12, wherein the step of maximizing the value of the first cash inventory and the second cash inventory includes eliminating at least a portion of at least one of the first cash inventory and the second cash inventory.

* * * * *